(12) United States Patent
Lee et al.

(10) Patent No.: US 8,328,404 B2
(45) Date of Patent: Dec. 11, 2012

(54) DISPLAY DEVICE

(75) Inventors: Joo-Young Lee, Yongin (KR); Ji-Hwan Jang, Yongin (KR)

(73) Assignee: Samsung Display Co., Ltd. (KR)

( * ) Notice: Subject to any disclaimer, the term of this patent is extended or adjusted under 35 U.S.C. 154(b) by 128 days.

(21) Appl. No.: 12/956,377

(22) Filed: Nov. 30, 2010

(65) Prior Publication Data

US 2012/0044714 A1    Feb. 23, 2012

(30) Foreign Application Priority Data

Aug. 20, 2010  (KR) ........................ 10-2010-0081006

(51) Int. Cl.
*F21V 7/04* (2006.01)
(52) U.S. Cl. ........................ 362/609; 362/368; 362/634
(58) Field of Classification Search .................. 362/609, 362/606, 607, 612, 613, 632, 633, 367, 368
See application file for complete search history.

(56) References Cited

U.S. PATENT DOCUMENTS

| | | | |
|---|---|---|---|
| 6,929,392 B2 * | 8/2005 | Kim et al. ...................... | 362/632 |
| 7,056,002 B2 | 6/2006 | Kang et al. | |
| 7,333,163 B2 * | 2/2008 | Huang et al. ................... | 349/58 |
| 7,473,023 B2 * | 1/2009 | Chun et al. .................... | 362/634 |
| 7,481,569 B2 * | 1/2009 | Chang .......................... | 362/633 |
| 7,561,225 B2 * | 7/2009 | Nakagawa et al. ............. | 349/60 |
| 7,656,470 B2 * | 2/2010 | Yu .................................. | 349/58 |
| 7,682,064 B2 * | 3/2010 | Lee ............................... | 362/632 |
| 7,719,628 B2 * | 5/2010 | Suh et al. ........................ | 349/58 |
| 7,726,868 B2 * | 6/2010 | Terada et al. .................. | 362/633 |
| 7,744,265 B2 * | 6/2010 | Kang et al. ..................... | 362/633 |
| 7,764,335 B2 * | 7/2010 | Tanaka et al. ................... | 349/65 |
| 7,940,353 B2 * | 5/2011 | Tanaka ............................ | 349/65 |
| 2002/0021382 A1 * | 2/2002 | Hasegawa ....................... | 349/58 |
| 2002/0167626 A1 * | 11/2002 | Matsuda et al. ............... | 349/65 |
| 2003/0043312 A1 * | 3/2003 | Nishida et al. ................ | 349/58 |
| 2010/0165237 A1 * | 7/2010 | Jung ............................... | 349/58 |

FOREIGN PATENT DOCUMENTS

| | | |
|---|---|---|
| KR | 10-0452419 B1 | 10/2004 |
| KR | 10-2005-0005878 A | 1/2005 |
| KR | 10-2005-0082211 A | 8/2005 |
| KR | 10-2008-0086283 A | 9/2008 |
| KR | 10-2008-0097699 A | 11/2008 |

* cited by examiner

*Primary Examiner* — John A Ward
(74) *Attorney, Agent, or Firm* — Knobbe Martens Olson & Bear LLP

(57) ABSTRACT

A display device including: a display panel displaying an image; a light source unit supplying light to the display panel; a light guide including: an incidence plane facing the light source unit; an emission plane facing the display panel; and a light guide protrusion protruding in a direction perpendicular to a side of the light guide at an edge of the light guide; a reflection sheet arranged opposite to the surface of the emission plane of the light guide, and including a reflection protrusion protruding in a direction perpendicular to a side of the reflection sheet at an edge of the reflection sheet; and a supporting frame supporting an edge of the display panel, the light guide, and the reflection sheet, the supporting frame including: a light guide protrusion receiving groove receiving the light guide protrusion; and a reflection protrusion receiving groove receiving the reflection protrusion.

7 Claims, 3 Drawing Sheets

DISPLAY DEVICE

CROSS-REFERENCE TO RELATED APPLICATIONS

This application claims the benefit of Korean Patent Application No. 10-2010-0081006, filed Aug. 20, 2010, in the Korean Intellectual Property Office, the disclosure of which is incorporated herein by reference.

BACKGROUND

1. Field

Aspects of the present invention relate generally to a display device. More particularly, aspects of the present invention relate generally to a display device including a liquid crystal display panel, a light guide, and a reflection sheet.

2. Description of the Related Art

A display device including a liquid crystal display (LCD) panel is a non-self-emitting element that uses a backlight assembly to produce light. The backlight assembly includes a light guide, a reflection sheet, and optical sheets along with a light source unit. The light guide, the reflection sheet, and the optical sheets are supported by a supporting frame.

However, if the supporting frame does not stably fix the light guide and the reflection sheet, light leakage may occur at an edge of the light guide. Also, if the reflection sheet does not lay uniformly flat and is creased, a luminance of images displayed by the display device becomes non-uniform.

The above information disclosed in this Background section is only for enhancement of understanding of the background of the described technology and therefore it may contain information that does not form the prior art that is already known in this country to a person of ordinary skill in the art.

SUMMARY

Aspects of the present invention provide a display device suppressing deterioration by effectively fixing a position of a light guide and a reflection sheet.

Aspects of the present provide a display device having a display panel displaying an image; a light source unit supplying light to the display panel; a light guide including: an incidence plane facing the light source unit; an emission plane facing the display panel; and a light guide protrusion protruding in a direction perpendicular to a side of the light guide at an edge of the light guide; a reflection sheet arranged opposite to the surface of the emission plane of the light guide, and including a reflection protrusion protruding in a direction perpendicular to a side of the reflection sheet at an edge of the reflection sheet; and a supporting frame supporting an edge of the display panel, the light guide, and the reflection sheet, the supporting frame including: a light guide protrusion receiving groove receiving the light guide protrusion of the light guide; and a reflection protrusion receiving groove receiving the reflection protrusion of the reflection sheet.

According to another aspect of the present invention, the light guide protrusion receiving groove and the reflection protrusion receiving groove may be separated from each other according to a side of the supporting frame.

According to another aspect of the present invention, the light guide protrusion of the light guide and the reflection protrusion of the reflection sheet may be arranged so as to not be overlapped.

According to another aspect of the present invention, a flexible circuit board connected to one side of the display panel may be further included.

According to another aspect of the present invention, the light source unit may be integrally formed with the flexible circuit board.

According to another aspect of the present invention, optical sheets disposed between the light guide and the display panel may be further included, and the supporting frame may support an edge of the optical sheets.

According to another aspect of the present invention, the display device may further include an adhesive member attached to the supporting frame along with the reflection protrusion of the reflection sheet so as to fix the reflection protrusion of the reflection sheet inside the reflection protrusion receiving groove of the supporting frame.

According to another aspect of the present invention, a receiving member combined with the supporting frame so as to receive the light guide and the reflection sheet may be further included, and the adhesive member may be attached to the edge of the supporting frame facing the bottom surface of the receiving member.

According to aspects of the present invention, the display device may effectively fix the light guide and the reflection sheet, thereby suppressing deterioration.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
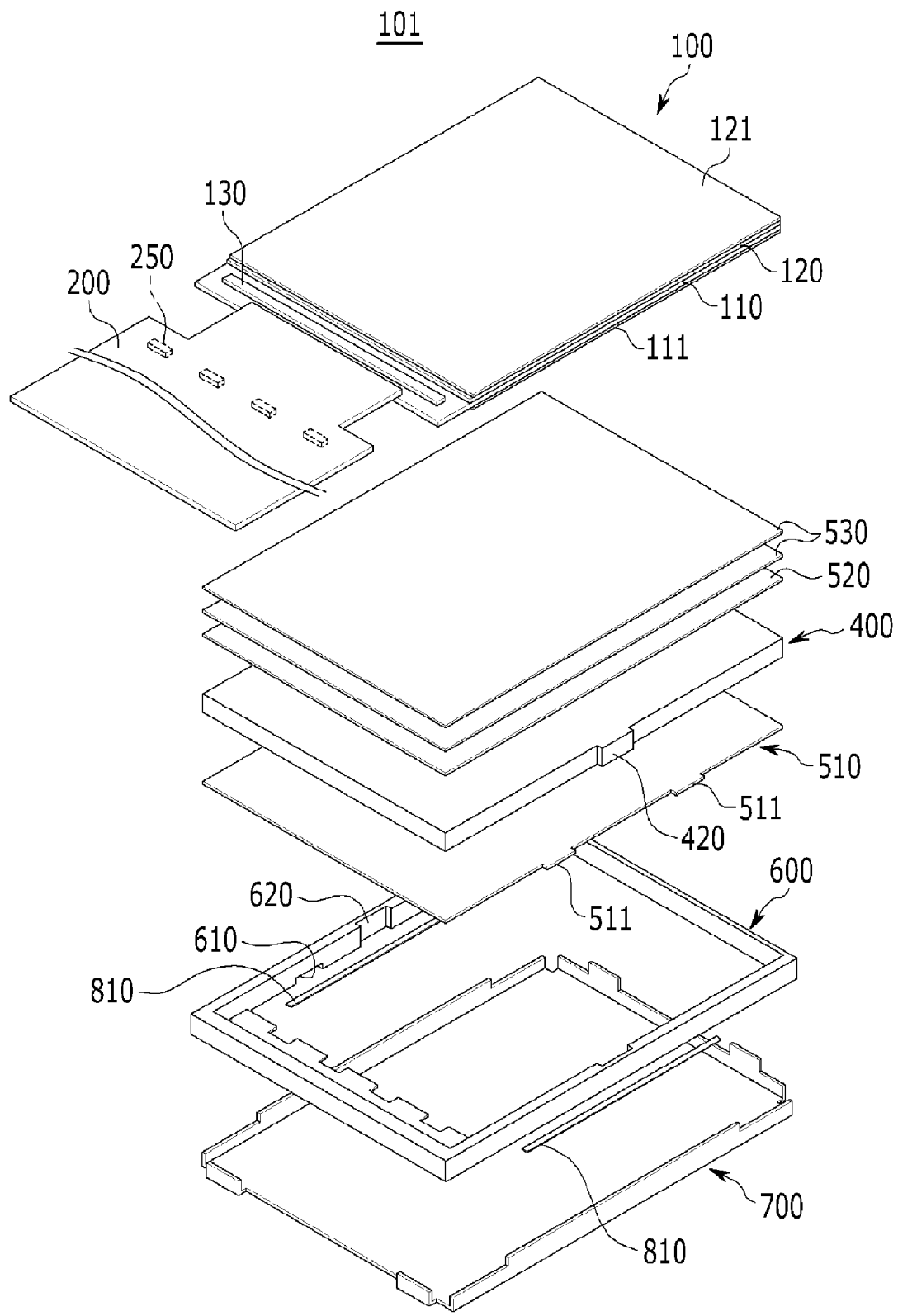
FIG. 1 is an exploded perspective view of a display device according to an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures. It is to be understood that where it is stated herein that a film, item or layer is "formed on" or "disposed on" a second layer, item or film, the first layer, item or film may be formed or disposed directly on the second layer, item or film or there may be intervening layers, items or films between the first layer, item or film and the second layer, item or film. Further, as used herein, the term "formed on" is used with the same meaning as "located on" or "disposed on" and is not meant to be limiting regarding any particular fabrication process.

Hereinafter, a display device according to an exemplary embodiment will be described with reference to FIG. 1 to FIG. 3. As shown in FIG. 1, a display device 101 includes a display panel 100, a light source unit 250, a light guide 400, a reflection sheet 510, optical sheets 520 and 530, a supporting frame 600, an adhesive member 810, and a receiving member 700. The display device 101 includes a flexible printed circuit board (FPCB) 200 supplying a driving signal to the display panel 100, and an integrated circuit chip 130. The FPCB 200 is connected to one edge of the display panel 100, and the integrated circuit chip 130 is mounted on the display panel 100.

According to aspects of the present invention, the FPCB 200 is integrally formed with the light source unit 250. That is, the light source unit 250 is mounted on the FPCB 200. However, aspects of the present invention are not limited thereto and the light source unit 250 may be formed separately from the FPCB 200 and may be connected to the FPCB 200. Also, the FPCB 200 may be mounted with several circuit elements to generate driving signals that will be supplied to the display panel 100.

The display panel 100 includes a first substrate 110, a second substrate 120 arranged opposite to the first substrate 110, and a liquid crystal layer (not shown) disposed between the first substrate 110 and the second substrate 120. Here, the first substrate 110 is a rear substrate, and the second substrate 120 is a front substrate. Also, the second substrate 120 has a smaller size than the first substrate 110.

Although not required in all aspects of the present invention, the display panel 100 further includes a first polarizing member 111 and a second polarizing member 121 respectively attached to the rear surface of the first substrate 110 and the front surface of the second substrate 120. The integrated circuit chip 130 is mounted on the edge of the first substrate 110 so that it does not overlap the second substrate 120. Also, the FPCB 200 is connected to the edge of the first substrate 110 on which the integrated circuit chip 130 is mounted.

The display panel 100 displays images through pixels (not shown), which are minimum units used to display images. The first substrate 110 includes a thin film transistor (TFT) (not shown) as a switch formed in each pixel, and a pixel electrode (not shown) connected to the thin film transistor. The second substrate 120 includes a common electrode (not shown). Also, one of the first substrate 110 and the second substrate 120 further includes a color filter (not shown). The liquid crystal layer (not shown) is disposed between the pixel electrode of the first substrate 110 and the common electrode of the second substrate 210.

If the thin film transistor is turned on, an electric field is formed between the pixel electrode and the common electrode. The electric field changes a liquid crystal alignment angle of the liquid crystal layer (not shown) between the first substrate 110 and the second substrate 210. Thereby, a transmittance level of each pixel is changed in the display panel 100. Through these transmittance levels, the display panel 100 controls a transmittance of light passing through the display panel 1100, thereby realizing desired images.

The light source unit 250 generates light and provides it to the display panel 100. The light source unit 250 includes light emitting diodes (LED) (not shown). According to aspects of the present invention, the light source unit 250 is disposed under one edge of the display panel 100 connected to the FPCB 200. The light source unit 250 is mounted to the FPCB 200, and receives a light source control signal from the FPCB 200. However, aspects of the present invention are not limited thereto, and the light source unit 250 may be disposed or mounted in other suitable manners.

In FIG. 1, the FPCB 200 is shown as being folded, for a purpose of better understanding and ease of description. If the display device 101 is assembled, a portion of the FPCB 200 connected to the one edge of the display panel 100 is bent and a remaining portion of the FPCB 200 is positioned toward a rear surface of the display panel 100. The light source unit 250 is also disposed under one edge of the display panel 100. As shown in FIG. 1, the light source unit 250 includes four light emitting diodes, however aspects of the present invention are not limited thereto. Accordingly, the light source unit 250 may include any suitable number of light emitting diodes as necessary.

The light guide 400 is disposed opposite to the rear surface to the display panel 100. In detail, the light guide 400 has an incidence plane facing the light source unit 250 and an emission plane facing the display panel 100. The light guide 400 guides the light emitted from the light source unit 250 and transmits it to the rear surface of the display panel 100 in a substantially uniform manner. The light guide 400 includes at least one light guide protrusion 420 protruding in a direction perpendicular to a side of the light guide 400 from an edge of the light guide 400. That is, one side of the light guide 400 facing the light source unit 250 among four sides of the light guide 400 is the incidence plane, and at least one light guide protrusion 420 is formed on at least one side of three sides of the light guide 400 except for the incidence plane side of the light guide 400.

The reflection sheet 510 is arranged corresponding to the rear surface of the light guide 400, which is a surface opposite to the emission plane of the light guide 400. The reflection member 510 reflects light that is incident upon the light guide 400 from the light source unit 250 in a direction towards the first substrate 110. Accordingly, a loss of light is reduced and the reflection sheet 510 helps to diffuse the light in the light guide 400. The reflection sheet 510 includes at least one reflection protrusion 511 protruding in a direction perpendicular to a side of the reflection sheet 510 from an edge of the reflection sheet 510. The reflection protrusion 511 of the reflection sheet 510 is disposed so as to not overlap with the light guide protrusion 420 of the light guide 400.

If the reflection protrusion 511 of the reflection sheet 510 overlaps the light guide protrusion 420 of the light guide 400, the light reflected by the reflection protrusion 511 of the reflection sheet 510 is passed through the light guide protrusion 420 of the light guide 400 and is emitted outside through a gap between the display panel 100 and the supporting frame 600. The light that is generated in the light source unit 250 and progresses toward the display panel 100 after passing the light guide 400 is mainly blocked or transmitted by the display panel 100 according to aspects of the present invention.

The light guide protrusion 420 protrudes in the direction perpendicular to the side of the light guide 400. Thus, light that is reflected by the reflection protrusion 511 and which progresses towards the display panel 100 after passing the light guide protrusion 420 may be easily and unnecessarily emitted outside through a gap between the edge of the display panel 100 and the supporting frame 600. That is, the display device 101 generates a leakage deterioration with respect to light leakage. However, according to aspects of the present invention, the reflection protrusion 511 does not overlap the light guide protrusion 420 such that the light leakage through the light guide protrusion 420 may be effectively suppressed.

The optical sheets 520 and 530 are disposed between the light guide 400 and the display panel 100. The plurality of optical sheets 520 and 530 further diffuse the light progressing from the light guide 400 to the display panel 100 and enhance luminance. In detail, according to aspects of the present invention, the optical sheets 520 and 530 include a diffusion sheet 520 and a pair of prism sheets 530. The diffusion sheet 520 is arranged opposite to the light guide 400 such that the light emitted from the light guide 400 is further diffused. The prism sheet 530 concentrates the light having progressed to the diffusion sheet 520 in the front direction.

Here, the pair of prism sheets 530 has grains formed in crossing directions. However, aspects of the present invention are not limited to the above, and the optical sheets 520 and 530 may include other suitable configurations.

Figure 2:
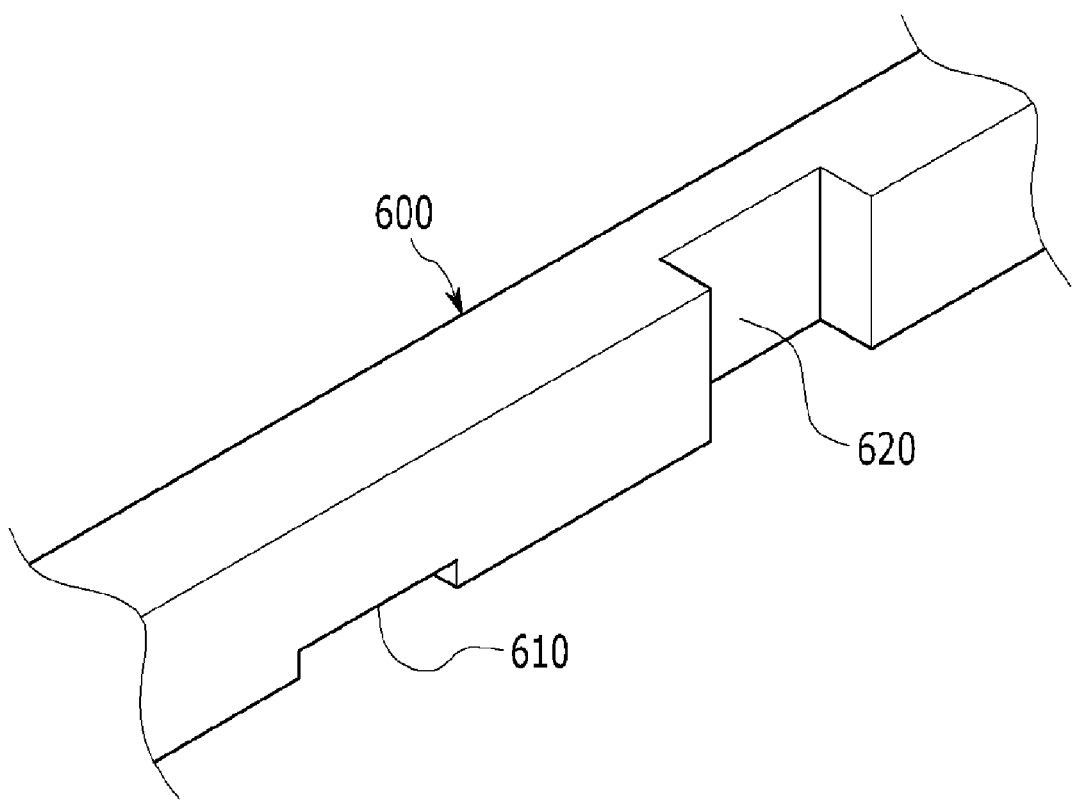
FIG. 2 is an enlarged partial perspective view of a light guide protrusion receiving groove and reflection protrusion receiving groove of the supporting frame shown in FIG. 1.

As shown in FIG. 2, the supporting frame 600 includes a light guide protrusion receiving groove 620 receiving the light guide protrusion 420, and a reflection protrusion receiving groove 610 receiving the reflection protrusion 511. That is, the light guide protrusion 420 is inserted into the light guide protrusion receiving groove 620 such that movement of the light guide 400 is suppressed. Also, the reflection protrusion 511 is inserted into the reflection protrusion receiving groove 610 such that movement of the reflection sheet 510 is suppressed.

The light guide protrusion receiving groove 620 and the reflection protrusion receiving groove 610 are separated from each other according to a side of the supporting frame 600 in a manner corresponding to a separation between the light guide protrusion 420 and the reflection protrusion 511. The supporting frame 600 encloses the edges of the display panel 100, the light guide 400, the reflection sheet 510, and the optical sheets 520 and 530, thereby supporting them.

Figure 3:
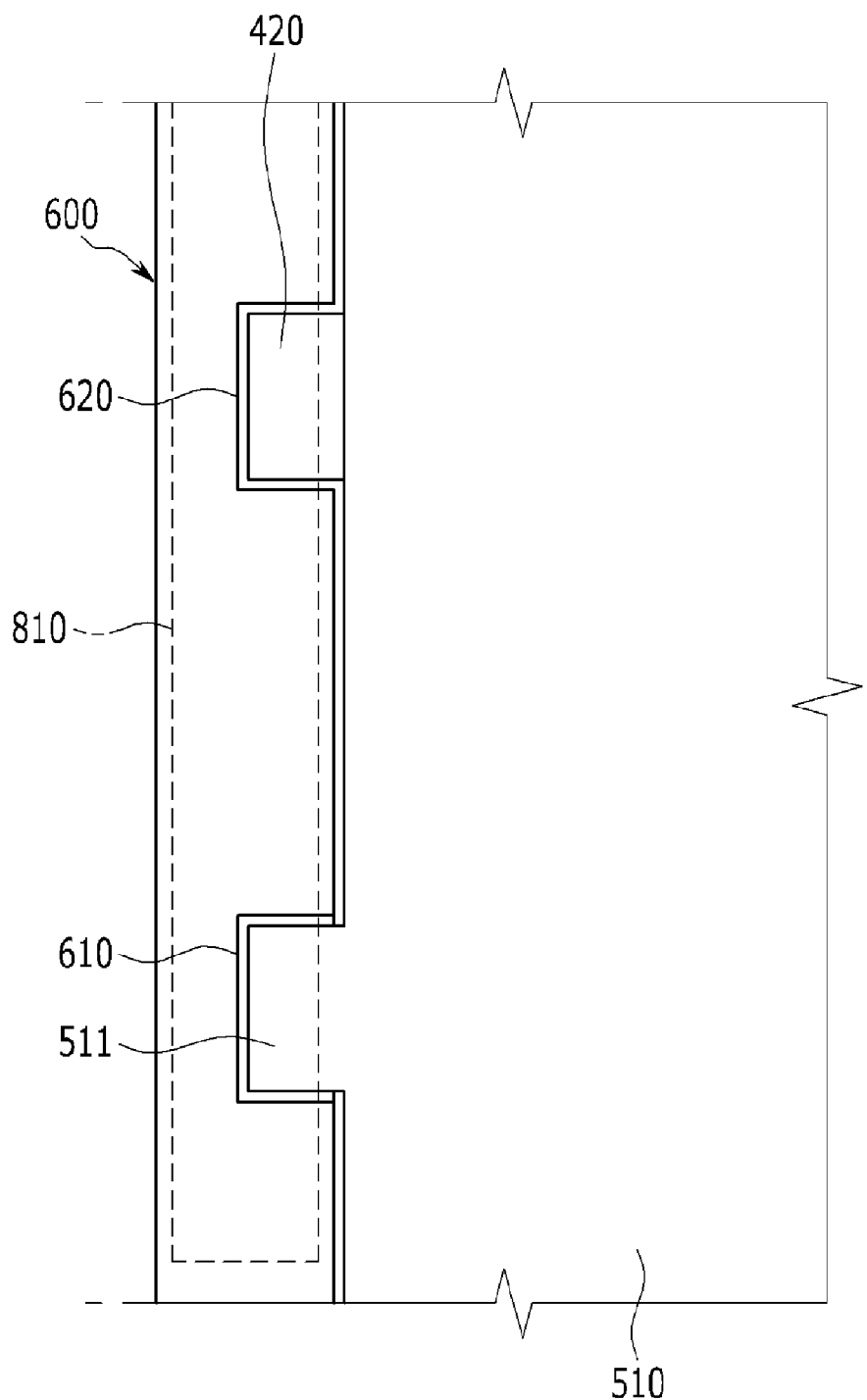
FIG. 3 is a rear top plan view of the supporting frame shown in FIG. 2.

As shown in FIG. 3, the adhesive member 810 is attached to the supporting frame 600 along with the reflection protrusion 511 of the reflection sheet 510 in order to fix the reflection protrusion 511 in the reflection protrusion receiving groove 610. That is, the adhesive member 810 attaches the reflection protrusion 511 to the supporting frame 600.

As described above, and although not required in all aspects of the present invention, the edge of the reflection sheet 510 is not wholly fixed through the adhesive member 810, and the reflection protrusion 511 is fixed in position by the adhesive member 810. Accordingly, after fixing the position of the reflection sheet 510, pressing or pushing of the reflection sheet 510 may be suppressed such that creasing of the reflection sheet 510 in a manufacturing process may be suppressed. When the entire edge of the reflection sheet 510 is fixed, if a portion of the reflection sheet 510 is pressed or pushed in the manufacturing process, creases may be easily generated in the reflection sheet 510 due to the fixed edge. However, according to aspects of the present invention, the portion of the reflection sheet 510 is fixed such that the position of the reflection sheet 510 may be easily maintained even if a portion of the reflection sheet 510 is pressed or pushed in the assembly process.

The receiving member 700 (see FIG. 1) is combined with the supporting frame 600 such that it receives the light guide 400, the reflection sheet 510, the light source unit 250, the optical sheets 520 and 530, and if necessary, the display panel 100. The adhesive member 810 is adhered to the edge of the supporting frame 600 facing the bottom surface of the receiving member 700.

Through this configuration, the display device 101, according to aspects of the present invention, effectively fixes a position the light guide 400 and the reflection sheet 510, thereby suppressing the deterioration of the display panel device 101 with respect to a light leakage and other deteriorations.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display device comprising:
   a display panel displaying an image;
   a light source unit supplying light to the display panel;
   a light guide comprising:
      an incidence plane facing the light source unit;
      an emission plane facing the display panel; and
      a light guide protrusion protruding in a direction perpendicular to a side of the light guide at an edge of the light guide;
   a reflection sheet arranged opposite to the surface of the emission plane of the light guide, and including a reflection protrusion protruding in a direction perpendicular to a side of the reflection sheet at an edge of the reflection sheet and disposed so as to not overlap with the light guide protrusion; and
   a supporting frame supporting an edge of the display panel, the light guide, and the reflection sheet, the supporting frame comprising:
      a light guide protrusion receiving groove receiving the light guide protrusion of the light guide; and
      a reflection protrusion receiving groove receiving the reflection protrusion of the reflection sheet.

2. The display device of claim 1, wherein the light guide protrusion receiving groove and the reflection protrusion receiving groove are separated from each other according to a side of the supporting frame.

3. The display device of claim 1, further comprising a flexible circuit board connected to one side of the display panel.

4. The display device of claim 3, wherein the light source unit is integrally formed with the flexible circuit board.

5. The display device of claim 1, further comprising optical sheets disposed between the light guide and the display panel, wherein the supporting frame supports an edge of the optical sheets.

6. The display device of claim 1, further comprising an adhesive member attached to the supporting frame along with the reflection protrusion of the reflection sheet so as to fix the reflection protrusion of the reflection sheet inside the reflection protrusion receiving groove of the supporting frame.

7. The display device of claim 6, further comprising a receiving member combined with the supporting frame so as to receive the light guide and the reflection sheet, wherein the adhesive member is attached to the edge of the supporting frame facing a bottom surface of the receiving member.

* * * * *